United States Patent [19]
Allsop et al.

[11] Patent Number: 5,382,038
[45] Date of Patent: * Jan. 17, 1995

[54] SHOCK ABSORBER FOR A VEHICLE

[75] Inventors: James D. Allsop; Paul Barkley, both of Bellingham; David E. Calapp, Bellevue, all of Wash.

[73] Assignee: Allsop, Inc., Bellingham, Wash.

[*] Notice: The portion of the term of this patent subsequent to Jul. 9, 2008 has been disclaimed.

[21] Appl. No.: 114,452

[22] Filed: Aug. 31, 1993

Related U.S. Application Data

[63] Continuation of Ser. No. 873,878, Apr. 22, 1992, Pat. No. 5,240,268, and a continuation-in-part of Ser. No. 947,274, Sep. 18, 1992, which is a continuation-in-part of Ser. No. 873,878, Sep. 18, 1992, which is a continuation of Ser. No. 589,771, Sep. 28, 1990, abandoned, which is a continuation-in-part of Ser. No. 521,130, May 9, 1990, Pat. No. 5,029,888, which is a continuation of Ser. No. 333,891, Apr. 7, 1989, Pat. No. 4,934,724, which is a continuation-in-part of Ser. No. 440,731, Nov. 22, 1989, Pat. No. Des. 324,837, Ser. No. 440,732, Nov. 22, 1989, Pat. No. Des. 324,836, and Ser. No. 440,733, Nov. 22, ,1989, Pat. No. Des. 325,008.

[51] Int. Cl.$^6$ .......................... B62K 19/02; B62J 1/02
[52] U.S. Cl. ................... 280/281.1; 188/378; 297/196; D12/111; D12/119
[58] Field of Search ................ 280/281.1, 220, 283, 280/287; D12/111, 119; 188/378; 297/196, 198, 215

[56] References Cited

U.S. PATENT DOCUMENTS

| | | |
|---|---|---|
| D. 230,963 | 3/1974 | Bauer . |
| 423,471 | 3/1890 | Easthope . |
| 457,080 | 8/1891 | Garford . |
| 468,823 | 2/1892 | O'Connor . |
| 505,753 | 9/1893 | Cocken . |
| 518,338 | 4/1894 | Whitaker . |
| 953,697 | 4/1910 | Kuebodaux . |
| 1,175,245 | 5/1929 | Osborn et al. . |
| 1,193,977 | 8/1916 | Bereth . |
| 1,416,942 | 5/1922 | Brooks . |
| 1,469,136 | 9/1923 | Ziska, Jr. . |
| 2,160,034 | 5/1939 | Schwinn . |
| 2,244,709 | 6/1941 | Knizel . |
| 2,283,671 | 5/1942 | Finley et al. . |
| 2,446,731 | 8/1948 | Wheler . |
| 2,485,484 | 10/1949 | Dean . |
| 2,497,121 | 2/1950 | Fletcher . |
| 2,755,103 | 7/1956 | Douglas . |
| 2,828,801 | 4/1958 | Papst . |
| 2,976,056 | 3/1961 | Henry . |
| 3,459,441 | 8/1969 | Hornsby . |
| 3,730,509 | 5/1973 | Jorn . |
| 3,833,242 | 9/1974 | Thompson, Jr. . |
| 4,162,797 | 7/1979 | McBride . |
| 4,421,337 | 12/1983 | Pratt . |
| 4,705,286 | 11/1987 | Lauzier et al. . |
| 4,934,724 | 6/1990 | Allsop et al. ............ 280/281.1 |
| 5,029,888 | 7/1991 | Allsop et al. ............ 280/281.1 |

FOREIGN PATENT DOCUMENTS

| | | |
|---|---|---|
| 5916 | 12/1979 | European Pat. Off. . |
| 453128 | 5/1913 | France ..................... 297/198 |
| 540517 | 7/1922 | France . |
| 72169 | 12/1893 | Germany . |
| 644617 | 5/1937 | Germany . |
| 63-225738 | 1/1989 | Japan . |
| 7132252 | 8/1982 | Taiwan, Prov. of China . |

OTHER PUBLICATIONS

AMF, *Junior Wheeled Goods*, Catalogue 1975, Model No. D-975SS.

Primary Examiner—Mitchell J. Hill
Attorney, Agent, or Firm—Christensen, O'Connor, Johnson & Kindness

[57] ABSTRACT

A bicycle including a novel bicycle frame and seat support as disclosed. Bicycle frame includes a top tube as a first section extends substantially vertically from the second section extends diagonally downward towards the rear tube to which two frame stays which are joined to chain stays adjacent the rear wheel hub are attached. A center tube extends from a bottom bracket to the top tube section adjacent where the frame stays are joined to the top tube. A beam seat support formed out of a pair of elongated beams is attached to the frame top tube first section. A bicycle seat is attached to the end of the beam seat support.

18 Claims, 7 Drawing Sheets

SHOCK ABSORBER FOR A VEHICLE

BACKGROUND OF THE INVENTION

This application is a continuation of U.S. patent application Ser. No. 07/873,878 filed Apr. 22, 1992, now U.S. Pat. No. 5,240,268, which is a continuation of U.S. patent application Ser. No. 07/589,771 filed Sep. 28, 1990, now abandoned, which is a continuation-in-part of U.S. patent application Ser. No. 07/521,130 filed Mary 9, 1990, now U.S..Pat. No. 5,029,888, which is a continuation of U.S. patent application Ser. No. 07/333,891 filed Apr. 7, 1989, now U.S. Pat. No. 4,934,724, Application Ser. No. 07/589,771 is also a continuation-in-part of U.S. patent application Ser. No. 07/440,731 filed Nov. 22, 1989, now U.S. Pat. No. Des. 324,837, U.S. patent application Ser. No. 07/440,732 filed Nov. 22, 1989, now U.S. Pat. No. Des. 324,836, and U.S. patent application Ser. No. 07/440,733 filed Nov. 22, 1989, now U.S. Pat. No. Des. 325,008. This application is also a continuation-in-part of U.S. patent application Ser. No. 07/947,274 filed Sep. 18, 1992, which is a continuation-in-part of patent application Ser. No. 07/873,878 filed Apr. 22, 1992, now U.S. Pat. No. 5,240,268, which is also related to previous applications as listed above.

FIELD OF THE INVENTION

This invention relates, in general, to a shock and vibration absorbing seat support for a vehicle and, in particular, to a combination beam seat support including a shock and vibration damping layer positioned between relatively movable structural members to absorb vibration and shock loads. As disclosed, the invention has particular application to bicycles, but is not limited thereto.

DESCRIPTION OF THE PRIOR ART

The problem of eliminating vibration and shocks to smooth the ride for a person sitting upon a vehicle traveling over rough ground has been a serious one since the development of the first vehicle. Solutions have typically involved separating the wheels of the vehicle from the vehicle frame by means of springs and shock absorbers as well as spring mounting the vehicle seat on the vehicle frame. In automobiles and tractors, for example, seats have been mounted using both coil springs, leaf springs and combinations thereof.

Referring particularly to the bicycle art wherein the present invention has relevant application, the seat support almost universally takes the form of a rigid tubular member inserted in a cooperating near vertical tube portion of a rigid bicycle frame. A seat, which may include a form of resilient spring cushioning, is typically mounted to the top of the tubular seat support.

The inflated tires mounted on the wheels are the initial and sometimes the only means for shock absorption on a bicycle. Low-pressure balloon tires of the type typically used for so-called "mountain" bikes can provide some limited shock and vibration absorption, but these bikes are often used in terrain where such severe shocks and vibrations are encountered that the ride smoothing effect of the tires is insufficient. Further, in other types of bikes where tire size is small and air pressure within the tire high, the ability of the tire to absorb shocks and vibration is near nonexistent. Consequently, most road shocks and vibrations experienced by present bicycles are transmitted directly to the bicycle seat and, thence, to the rider. In extreme eases, such as during long-distance races or during mountain bike races, the abuse suffered by riders from continual shocks and vibrations has been known to lead to temporary nerve damage, muscle cramps, and severe rider discomfort. See *Bicycle Guide,* August 1988, pages 75–78. Even during more normal riding conditions, shocks and vibrations create fatigue, decrease rider comfort and cause pain, particularly in that portion of the anatomy in contact with the bicycle seat.

In addition, the use of metal frames for bicycles has principally been driven by the requirement that the frame be able to withstand vibration and the substantial rider weight loads that are often unresiliently placed on the bicycle frame as a result of the bicycle hitting a severe bump. It is for this reason that lightweight bicycle frames, such as those formed of resin-bounded fibers surrounding rigid foam cores, have not found widespread acceptance.

Many attempts have been made to improve the spring mounting of bicycle seats, including the use of leaf springs as shown, for example, in U.S. Pat. Nos. 1,469,136; 2,244,709; and, 2,497,121. Such constructions have the drawback of allowing the rider to be alternately depressed downwardly and catapulted upwardly in a magnified and relatively uncontrolled fashion. In addition, such seats tend to sway laterally when the bicycle turns or rotates torsionally in an unstable and uncomfortable manner. A combination leaf spring and parallel motion bar seat support is shown in U.S. Pat. No. 1,416,942. A tricycle having a coil spring seat support allowing substantial vertical seat movement is shown in U.S. Pat. No. 4,162,797.

The problem of reducing vibration and shock to a rider has also been attempted to be solved through the use of shock absorbers and springs between the bicycle frame and wheels rather than between the seat and the frame. Examples of such arrangements developed over the past ninety years are shown in U.S. Pat. Nos. 423,471; 457,080; 468,823; 505,753; 518,338; 953,697; 2,160,034; 2,283,671; 2,446,731; 2,485,484; 2,976,056; 3,459,441; and, 4,421,337. These patents show the seriousness of the problem solved by the present invention and the numerous attempts to alleviate shocks and vibrations delivered to bicycle riders which have been made in the past. In spite of these attempts, almost all bicycle seats in use today have little ability to absorb vibration or shock. Substantial need still exists in the bicycle art, as well as in the vehicle seat support art in general, for an improved shock and vibration absorbing seat support.

SUMMARY OF THE INVENTION

The present invention discloses a seat support for a vehicle such as a bicycle including a combination beam adapted to be connected to the vehicle at one end and supporting a seat at its cantilevered opposite end. In one embodiment, the combination beam includes a first longitudinal portion fixedly connected to the vehicle, and a second longitudinal portion adapted to move with respect to the first portion in response to bending loads placed on the combination beam such as shock and vibration loads encountered as the vehicle and rider move over rough terrain. The first and second portions of the combination beam are preferably joined together along a portion of the beam to provide lateral and torsional stiffness and stability to the beam. An energy absorbing material of low durometer, such as an elastomeric member or layer, is positioned between the first and second portions of the beam such that relative movement of the second portion of the combination beam with respect to the first portion causes the elastomeric material to be deformed, thus absorbing energy and cushioning the seat mounted on the beam from shocks and vibration encountered by the vehicle itself. A combination beam suitable for mounting on a conventional bicycle and a lightweight bicycle and bicycle frame including integral combination beam seat supports are disclosed, but it will be understood that shock absorbing combination beams made in accord with the teaching of the present invention may also be used with other types of vehicles which are subject to vibration and shock loads.

Other features and advantages of the present invention will be apparent from the following description taken in conjunction with the accompanying drawings, in which like reference numerals designate the same or similar parts.

DETAILED DESCRIPTION OF THE INVENTION

Figure 1:
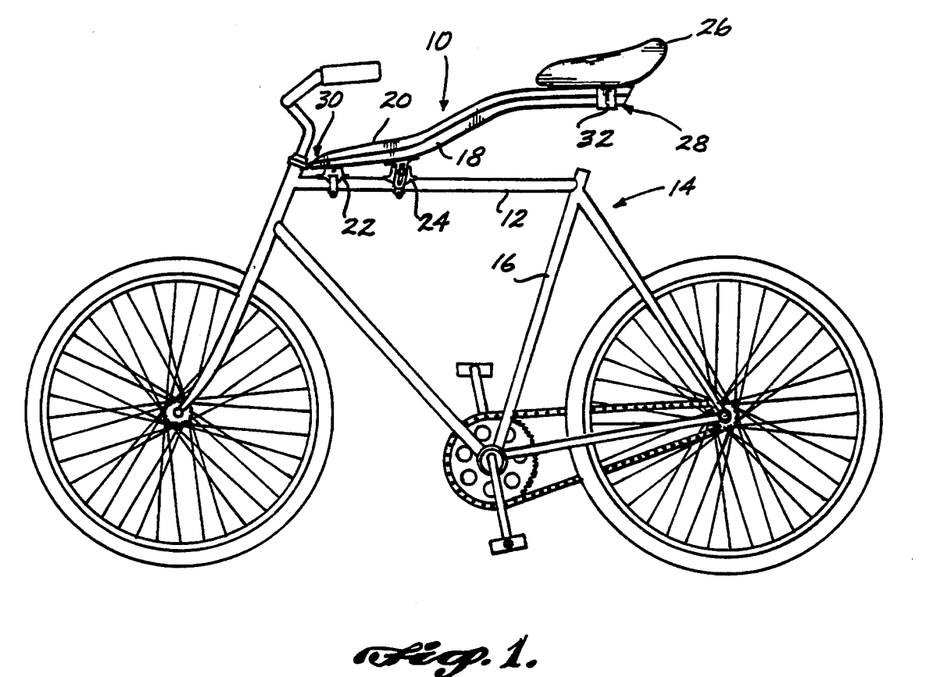
FIG. 1 is a side elevation view of a conventional bicycle including the combination beam seat support of the present invention.

Referring initially to FIG. 1, a combination beam seat support 10 is shown mounted on the horizontal top tube 12 of a conventional bicycle 14. As shown, the conventional sliding seat support tube which is adapted to be slipped downwardly into seat post tube 16 has been removed from the bicycle frame. While the combination beam seat support of the present invention finds significant utilization in connection with cycles including bicycles, it will be understood that the present invention will reduce vibration and shock to the seat of any type of vehicle moving over rough terrain. Thus, while a particular unique mounting arrangement of one embodiment of the present invention on tube 12 of a bicycle frame is disclosed in FIGS. 1 and 2, it will be understood that other mounting arrangements, either for bicycles, or for other types of vehicles, may readily be used in connection with the present invention.

Combination beam seat support 10 includes a first lower portion 18 and a second overlying upper portion 20. Portion 18 is connected to beam 12 by pivotal mounting means 22, and the angular position of the combination beam with respect to tube 12 is controlled by pivot control means 24. A conventional seat 26 is shown mounted on the end 28 of combination beam 10 distal from beam end 30. A conventional seat mounting means 32 adapted to surround and grip end 28 is shown mounting seat 26 thereon. It will be understood that seat 26 may be moved longitudinally along end 28 by releasing and tightening mounting means 32 to accommodate changes in the height of the seat above the bicycle frame. Typically, it is desired to have the mounting means 32 positioned about 24 inches rearward of mounting means 22, although this is a matter of rider choice.

As illustrated, beam 10 is shown curved along the central portion of its length such that the forward portion 30 of the beam is generally adjacent tube 12 to readily allow the rider to straddle the combination beam when standing astride the bicycle. End 28 of the combination beam is shown positioned a distance above tube 12 to allow seat 26 room to move upwardly and downwardly in response to bending of beam 10 under rider weight and vibration and shock loads. The angle of beam 10 with respect to tube 12, and thus the height of seat 26 above tube 12 is principally determined by the comfort and leg length of the rider.

It is understood that the seat 26 should not be positioned so low that the end 28 of the beam 10 bottoms out against either the top tube 12 or the upper end of the seat post tube 16. The beam 10 will support an individual of normal weight without flexing to the point where it contacts the supporting bicycle frame elements. When the beam 10 is used to support a heavy individual, it may be desirable to leave the sliding seat support tube in place inside the seat post tube 16 so that the seat support tube can serve as a stop that prevents excessive downward bending of the beam.

Figure 2:
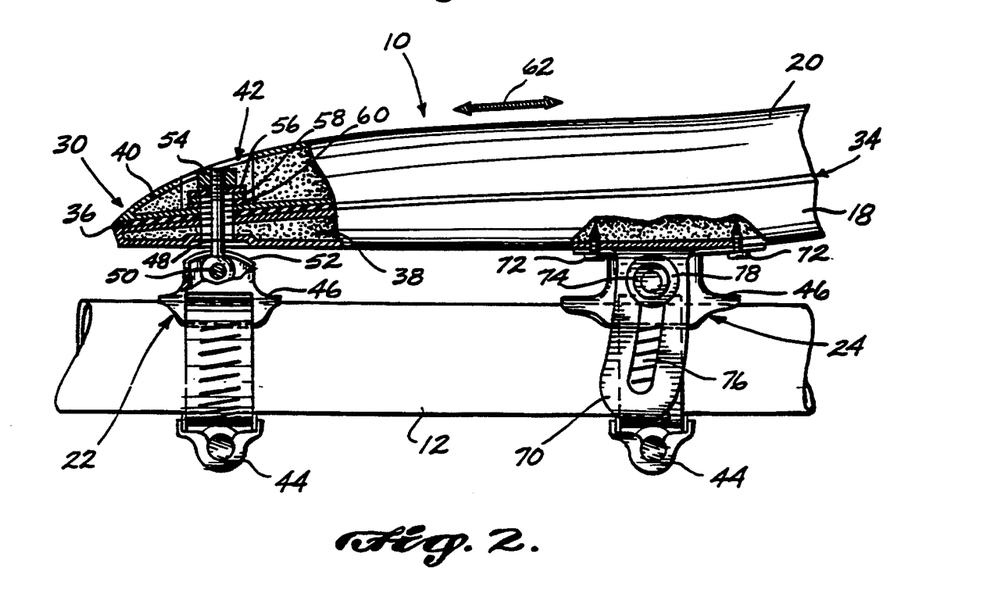
FIG. 2 is a partial cross-sectional view of one form of mounting and adjusting means for a combination beam seat support made according to the present invention.

Referring additionally to FIG. 2, it will be seen that combination beam seat support 10 includes a space or gap 34 between lower portion 18 and upper portion 20. As shown, gap 34 is filled with a layer of vibration and shock absorbing material 36. In a preferred embodiment, this material will have a low durometer and will be elastomeric in nature. As used herein, elastomeric is meant to describe a material capable of being deformed by relative movement between the upper and lower portions of the beam 10 and then returning to its original shape, thus absorbing the kinetic energy of the relatively moving beam portions. The material must have a tendency to resist deformation or compression, thus slowing the relative movement of the upper and lower portions of the combination beam, and also a tendency to resiliently return to its original shape over a period of time. An elastomer made of polyurethane, having viscoelastic properties such that beam movement is resisted in both directions has been found to be a satisfactory material. Many elastomer materials having a relatively low modulus of elasticity and formed either in a layer or in other configurations sandwiched between or otherwise interconnected with the upper and lower portions of the combination beam, will also be satisfactory for use in this invention.

In a preferred embodiment, lower portion 18 and upper portion 20 of combination beam 10 are formed of a rigid foam material 38 encased within a hardened resin and fiber shell 40. Foam 38 may be a rigid polyurethane foam while shell 40 may be formed of fiberglass and epoxy resin. It will be understood that other foams and resins, as well as other fibers including graphite fibers, may also be satisfactorily used in the construction of these lightweight beam portions so long as the resulting product has the needed structural integrity and a relatively high modulus of elasticity. Of course, more conventional bicycle materials, such as steel or aluminum, may also be used in the combination beam construction with, however, the likely sacrifice of the advantages of weight reduction. Beams formed to include a plurality of elastomeric layers positioned between relatively rigid members are also considered to be within the scope of this invention. A beam constructed to have a vertical deflection at its free end of approximately 100 lbs. per inch has been found to be satisfactory for the present invention. Of course, the beams can be made more or less resistant to bending by varying the glass structure, the size of the beam, the durometer of the elastomer or by other known techniques.

In one method of construction of the upper and lower portions of the combination beam, a braided fiberglass sock having its fibers generally oriented at 45° to the longitudinal dimension of the core is slipped over a preformed foam core. Unidirectional fiberglass elements are then laid thereover to additionally strengthen the beam. Other layers of fiberglass mat may be added at strategic load bearing areas such as the end pivot point, the fulcrum point adjacent pivot control 24, and the seat mounting end 28 of the beam portions and a second sock is then slipped thereover to hold these elements in place. The beam portion is then thoroughly wetted with resin and cured, preferably under pressure. After both beam portions are formed, they are joined along a portion of their length, typically by epoxy resin. One of the beam portions will typically include a raised platform on the surface to be joined to the other beam portion. In this way, gap 34 is formed in the completed combination beam 10. Other known construction techniques and materials may alternatively be used and are considered to be within the scope of this invention. After beam 10 is constructed, the layer of vibration-reducing material 36 is inserted within gap 34 preferably by placing beam member 10 in a mold and injecting the material into gap 34 under pressure.

In an alternative method of construction, the lower and upper sections 18 and 20 of the beam 10 are formed by initially placing reinforcing sections of fiberglass over specific sections of the basic foam core material 38 that are subjected to significant mechanical stress. Specifically, the reinforcing material is placed over the foam core 38 in the vicenty of adjacent to where both the threaded fastener 48 and slotted brackets 70, both described hereinafter, are joined to the beam 10. The reinforcing material is also placed over the tail end of the foam core 32 where the seat mounting meating 32 is attached to the beam 10. A layer of fiberglass is then wrapped longitudinally around the form core. This inner wrap layer is formed of fibers formed primarily of unidirectional fibers that are oriented parallel to the longitudinal axis of the foam core 38. A braided sock formed of either fiberglass or a carbon-fiber composite material is then fitted over the the assembly. The assembly is then placed in a mold between a thin sheets of plastic that are opaque to ultraviolet light. Epoxy is injected into the mold between the plastic and the foam core 38 so that the reinforcing sections, the inner wrap and the outer braiderd sock are embedded in the epoxy so as to form the center of the shell 40. The elastomerie material 36 is then inserted into the gap 34 between the lower and upper sections 18 and 20 respectively to complete construction of the beam 10.

It is further understood that alternative materials and methods of constructions may be used to manufacture the beam 10 of this invention. For example, it may be desirable to form the shell 40 with a braided sock formed out of Kevlar, an arimid fiber.

As shown in FIG. 2, beam 10 is formed to include a vertical opening 42 through end 30 by means of which the beam is connected to beam mounting means 22. As illustrated, beam mounting means 22 includes a conventional hose clamp type mount 44 surrounding top tube 12 and having bracket 46 mounted thereon atop beam 10. Other conventional connection means to beam 10 may also be used. Bracket 46 includes an upwardly extending threaded member 48 that is pivotally mounted therein by means of a conventional fastener 50 inserted through an opening in the bottom portion of the threaded member and through a cooperating opening in the laterally adjacent sides 52 of fitting 46. Threaded member 48 extends upwardly through opening 42 which extends through first lower portion 18, vibration dampening layer 36 and second upper portion 20.

A fastener, such as nut 54, is shown threaded onto the end of threaded member 48 which is adapted to bear upon a conventional washer 56 positioned therebelow. In order to allow upper member 20 of beam 10 to slide laterally with respect to fixed lower member 18 in the manner to be described hereafter, a pair of washers 58 and 60 may be positioned below washer 56. Washer 58 is formed of bronze or other material that has a relatively low coefficient of friction. Washer 60 is oval shapped slotted washer that is formed with an elongated opening.

The described construction allows upper beam portion 20 to move laterally with respect to pinned lower portion 18 of the beam as indicated by arrow 62 in spite of the substantial vertical compression load carried by nut 54 and its associated washers generated by the weight of a rider sitting on the cantilevered end 28 of beam 10. The lateral movement of upper portion 20 with respect to lower portion 18 caused by the bending of beam 10 causes the elastomeric layer 36 in gap 34 to be deformed in shear. The deformation of layer 36, or more precisely the resistance to lateral movement of upper beam portion 20 provided by the elastomerically deformed material 36, slows and smooths the movement of beam portion 20 and absorbs vibration and shock loads encountered by the wheels of the bicycle as it travels over rough terrain before they are transmitted to the seat 26. Likewise, body weight loads on seat 26 generated by rapid or sharp movements of the bicycle are slowed and dampened before transmission to the bicycle frame through combination beam 10.

Figures 4, 5, 6:
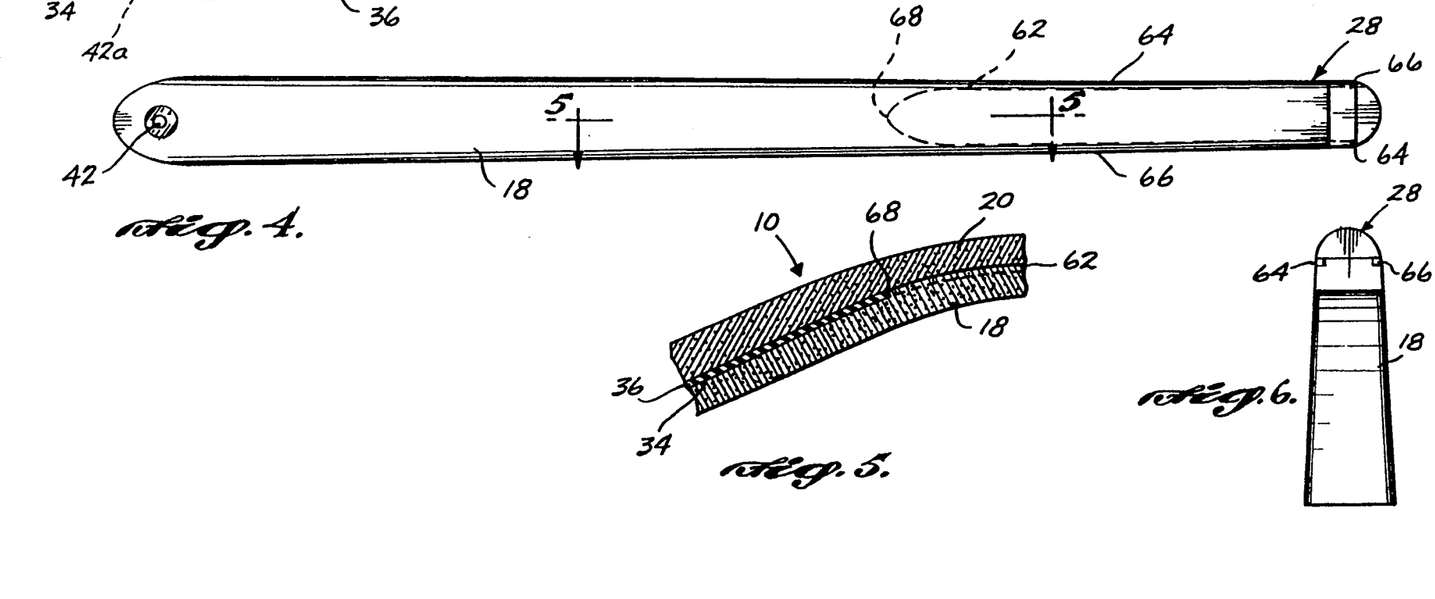
FIG. 4 is a bottom plan view of the combination beam seat support of FIG. 3 showing the interconnection between the upper and lower portions of the beam in dashed line.
FIG. 5 is a section view taken along lines 5—5 in FIG. 4.
FIG. 6 is a right-side elevational view of the combination beam seat support of FIG. 3.

Referring additionally to FIGS. 4 and 5, it will be seen that upper portion 20 and lower portion 18 of beam 10 are integrally connected adjacent beam end 28 as represented by the platform area within dashed line 62. Side channels 64 and 66 are provided adjacent area 62 to act as conduits for the elastomeric material when it is injected into gap 34 from end 30 of the beam as described heretofore. It will be understood that the elastomeric material flows to fill gap 34 until it encounters the prow 68 of the beam connecting platform 62 at which time the elastomeric material flows through channels 64 and 66 and exits the beam at end 28 as shown in FIG. 6.

Figure 3:
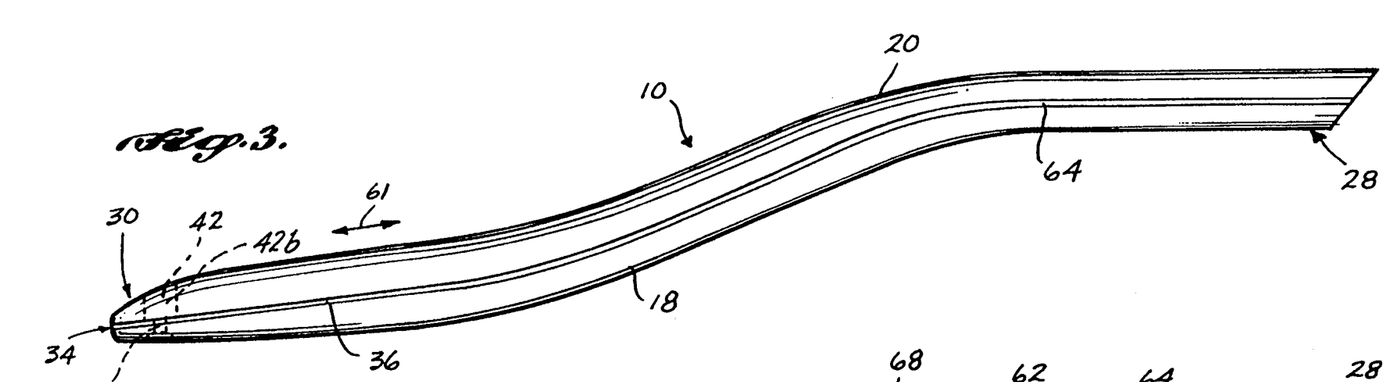
FIG. 3 is a side elevation view of one embodiment of the combination beam seat support made according to the present invention.

As shown in FIG. 3, in one embodiment of the present invention the elastomeric material 36 will appear to fill a gap 34 that runs from end-to-end of beam 10. In reality, however, the elastomeric material only completely fills the gap in the area from end 30 of the beam to the prow 68 of the integral connecting member 62. The beam being sealed from there to its end 28 except for side channels 64 and 66. Again, it will be understood that the particular beam construction described above is but one preferred embodiment of the present invention and that other embodiments including, but not limited to, a beam formed of beam portions having interlocking surfaces and elastomeric material having other configurations and locations, are all considered to be within the scope of this invention.

It is believed that joining the upper and lower portions 18 and 20 of the combination beam adjacent end 28 in the manner described heretofore provides lateral and torsional stability to the beam 10, but it will be understood that other means of connecting these members either integrally or by the use of fasteners or surrounding clamp members may also be used and are considered to be within the scope of this invention. It is also considered that the elastomeric layer may extend from end-to-end of the beam, again assuming that lateral and torsional stability is provided to the beam in some other manner.

Referring again to FIG. 2, the angle through which combination beam 10 may be pivoted to raise or lower seat 26 to accommodate riders of different leg length and weight is shown to be controlled by pivot control means 24. Means 24 includes a conventional hose clamp connector 44 encircling top tube 12 and adapted to hold a fitting 46 on the top portion of tube 12. A slotted bracket 70 is shown mounted by conventional fasteners 72 to the underside of bottom portion 18 of beam 10. A conventional pin clamp means such as cam lever clamp 74 and a cooperating threaded nut is inserted through washer 78 overlying a hole which extends through fitting 46 and is aligned with slots 76 in bracket 70 on opposite sides of fitting 46. It will be understood that by loosening the grip of cam lever clamp 74 on the sides of slotted brackets 70, beam 10 may be pivoted upwardly or downwardly. The cooperating fasteners may be tightened at any point along the travel of the beam 10 allowed by slots 76 to fix the seat 26 at a selected height above the bicycle frame.

In an alternative embodiment of the invention, the brackets 74 may be formed with a wedge profile such that they are relatively wide adjacent the beam lower section 18 and a relatively narrow at their ends. In a perfered embodiment of the invention, the taper along the length each bracket 74 is approximately 3°. The brackets 74 are held in place by a threaded fastener (not illustratd) that extends through the bracket slots 76 and the fitting 46 and a bolt (not illustrated) attached to the free end of the threaded fastener. The height of the brackets 74 and the beam-and-seat assembly is set by tightening or loosening the bolt attached to the threaded fastener. The weight of the individualy riding the bicycle forces the brackets downwards so that one is secured between the head of the threaded fastener and the fitting 46 and the other is secured between the bolt and the fitting. This eliminates the need to have to rely on friction fit-type fastening devices.

Other conventional seat height adjusting means may be substituted for pivot control means 24 so long as the goals of easy adjustment and stable locking of the combination beam and seat at a desired height above the frame of the bicycle are achieved.

Referring additionally to FIG. 1, it will be understood that when a load is placed upon seat 26, the end 28 of beam 10 is bent downwardly. Absent gap 34, the bending of beam 10 would place the bottom portion of the beam 18 in compression while the upper portion 20 of the beam would be stretched in tension. The incorporation of slot 34 in the combination beam allows the tension forces developed in upper portion 20 during downward bending of beam 10 to be relieved as upper portion 20 slips longitudinally along lower beam portion 18. The placement of elastomeric material 36 in gap 34, resists and slows the movement of upper portion 20 over lower portion 18 in the area of gap 34 thus slowing and damping the bending of beam 10 and substantially eliminating the transmission of vibrations and shock loads through beam 10.

Referring additionally to FIGS. 3 and 5, it will be understood that the thickness of elastomeric material 36 may be increased in the area of beam end 30 and reduced at the opposite end of gap 34 in the area of beam portion interconnection point 68. The relative movement of upper portion 20 with respect to fixed portion 18 is greatest near beam end 30 while movement is reduced to near zero near connection point 68. Consequently, increasing the thickness of elastomeric material 36 in the area of beam end 30, with an associated increase in the size of gap 34 will improve the vibration and shock absorbing characteristics of beam 10 while also extending the life of the shock absorbing material.

Vibration or shock absorption may be viewed as the reduction of the frequency or amplitude of motion of a beam, a structural member or a mass integral with the structural member. Assuming a solid beam 10 without a gap 34 or elastomeric material 36 therein, shocks and vibration encountered by the wheels of a bicycle as it travels over rough terrain would be transmitted through the beam to seat 26 without a significant reduction of frequency and possibly with an increase in amplitude as a result of the cantilevering of the beam. The provision of an elastomeric material within gap 34 and bonded to the adjacent surfaces of upper portion 20 and lower portion 18 of beam 10 allows the material to resist and slow the sliding movement of beam portion 20 with respect to beam portion 18 and thus the speed and distance at which the end 28 of beam 10 moves upwardly and downwardly. It is believed that the elastomeric material 36 absorbs the kinetic energy in the bicycle frame in the form of vibration and shock and transforms it into heat energy, which is dissipated.

While the above discussion has discussed the bending of beam end 28 downwardly under the weight load of a rider thus tensioning beam portion 20, it will be understood that the elastomeric material acts to resist movement of beam portion 20 in either direction with respect to beam portion 18 thus dampening vibration and shock when beam end 28 is moving upwardly as well as downwardly.

Again referring to FIG. 1, it will be understood that as upper beam portion 20 moves with respect to lower beam portion 18, the elastomeric material in gap 34 in the central curved portion of the combination beam is compressed as well as deformed in shear. The provision of a curve in combination beam 10 thus increases the energy absorption capability of the viscoelastic material in response to bending of the beam.

It will be appreciated that the beam mounting means 22 may be employed to control the bending characteristics of the beam 10. In this regard, the material composition of washer 56 may be selected to increase the friction with adjacent washer 58. Also, the engagement between the nut 54 and the threaded member 48 may be varied to change the compression load applied to elastomeric layer 36. This in turn results in a corresponding change in the ability of layer 36 to resist the movement of the upper beam portion 20 relative to the lower portion 18, thus controlling the stiffness of the beam 10.

Figure 8:
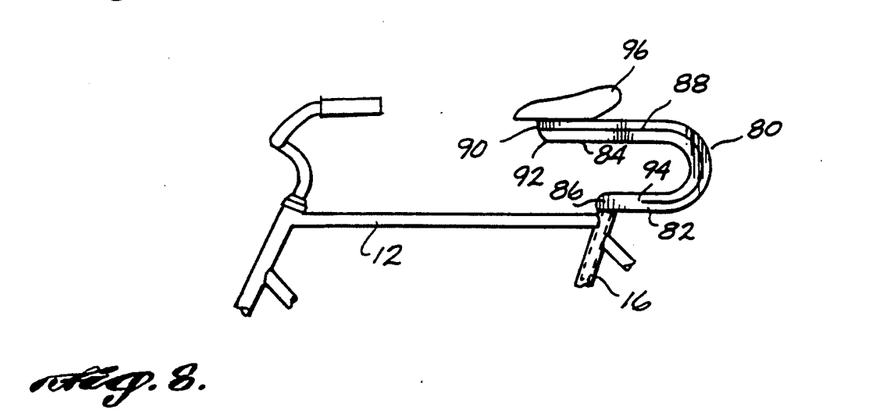
FIG. 8 is a partial side elevation view of an embodiment of a combination beam seat support made according to the present invention shown mounted on a conventional bicycle frame.

Referring additionally to FIG. 8, a combination beam 80 having a first portion 82 and a second adjacent portion 84 are integrally joined at beam end 86, is shown mounted on a conventional seat post inserted in seat post tube 16. A shock and vibration absorbing elastomeric material 88 is positioned between portions 82 and 84 in a gap 90 which begins at beam end 92 and runs along the curved beam to the point 94 where the beam portions are integrally joined. This embodiment could include an integrally molded seat 96 or a seat interconnected to beam end 92 by conventional means. An advantage of this design is the removal of the beam as an obstacle to the straddling of frame tube 12 when the bicycler is standing astride the bicycle.

Figure 9:
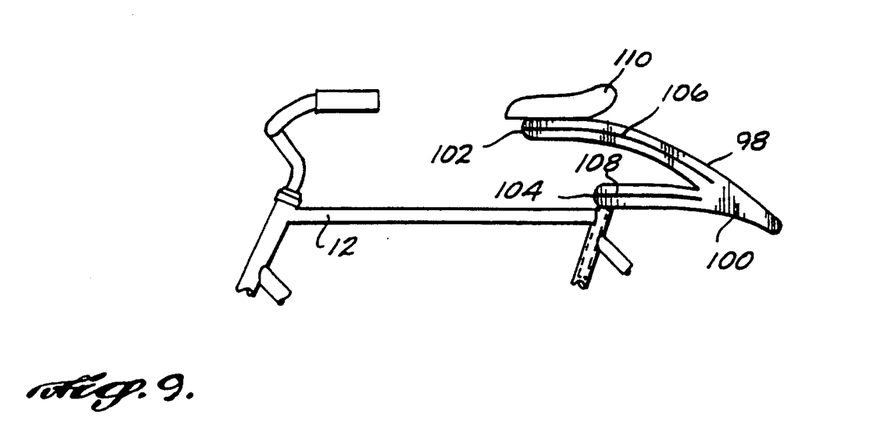
FIG. 9 is a partial side elevation view of another embodiment of a combination beam seat support made according to the present invention shown mounted on a conventional bicycle frame.

Referring additionally to FIG. 9, still another embodiment of a combination beam seat support is disclosed mounted on a conventional seat post and comprising a generally Y-shaped member 98 having an integral foot portion 100 which extends rearwardly to act as a fender or shield for spray coming off of the back wheel of the bicycle and gaps 102 and 104 filled with elastomeric material 106 and 108 in each leg of the Y. Again, seat 110 may be integrally molded with this member or affixed thereto by conventional means.

Figure 7:
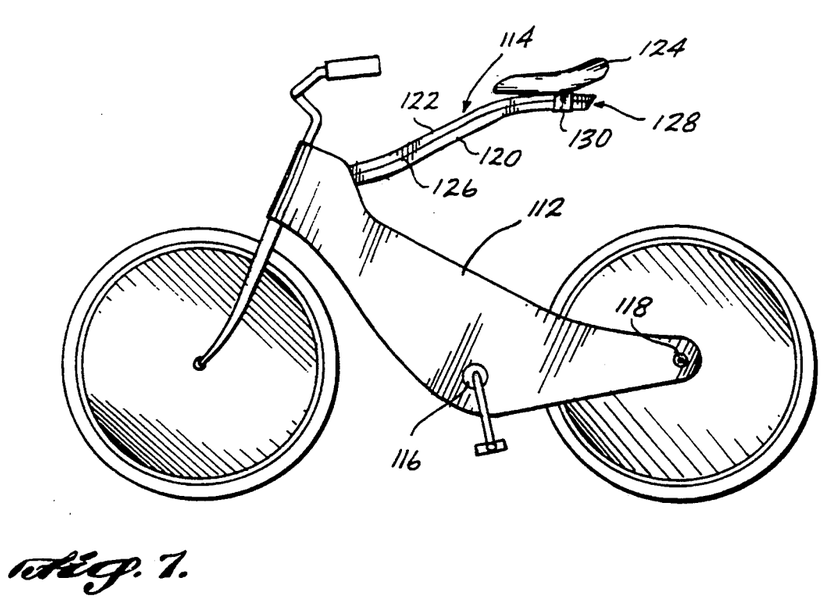
FIG. 7 is a side elevation view of an embodiment of a bicycle including a frame having an integral combination beam seat support made according to the present invention.

Referring to FIG. 7, an embodiment of a bicycle having a lightweight frame member 112 formed as a single piece of lightweight fiber and resin material is disclosed. It will be understood that the particular shape of this frame member is illustrative only. The use of a combination beam 114 to reduce shock and vibration loads to the frame 112 allows lightweight resin and fiber materials to be used in its construction. It is contemplated that metal inserts 116 and 118 would be incorporated into the lightweight frame member to strengthen it in areas of particular mechanical stress.

As shown in FIG. 7, combination beam 114 is integrally formed with frame 112 and includes a lower portion 120 adapted to be compressed under load an upper portion 122 adapted to be placed in tension responsive to the placement of loads upon seat 124, and elastomeric material 126 residing in gap 128 between the upper and lower portions. In the illustrated construction, seat support means 130 while interconnected with combination beam 114 must allow the upper and lower portions to slide relative to each other. It will be understood that a combination beam 10 such as that shown in FIG. 1 may be used with the lightweight molded frame shown in FIG. 7 instead of the integral beam 114. Alternatively, the lower portion 120 of the combination beam could be integral with the frame 112 while top portion 122 is connected thereto adjacent the seat supporting end and is adapted to slide with respect thereto in the area of the combination beams interconnected with frame 112.

Figure 10:
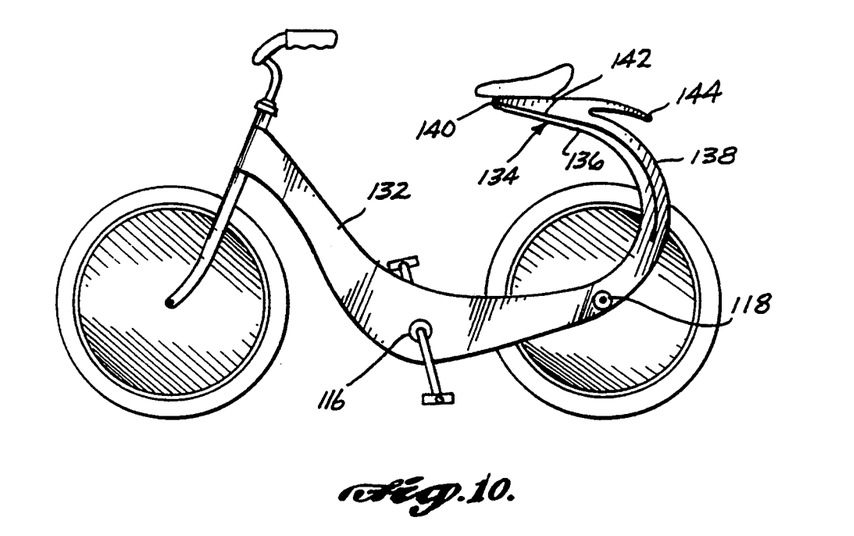
FIG. 10 is a side elevation view of still another embodiment of a bicycle and frame including an integral combination beam seat support made according to the present invention.

Referring now to FIG. 10, another embodiment of a bicycle having a lightweight resin and fiber frame member 132 is disclosed. In this embodiment, the integral combination beam seat support 134 is formed to extend forwardly from the rear wheel area of the bicycle. Again, the combination beam includes a lower portion 136, an upper portion 138, a gap 140 therebetween, and elastomeric material 142 positioned in gap 140. As illustrated, combination beam 134 would be at least partially split to accommodate the rear bicycle wheel and is further shown to include a rearwardly extending fender or spray shield 144. The frame design shown in FIG. 10 would have obvious application as a so-called "girls" bike, i.e., a bicycle not having a horizontally extending top tube 12.

Figure 11:
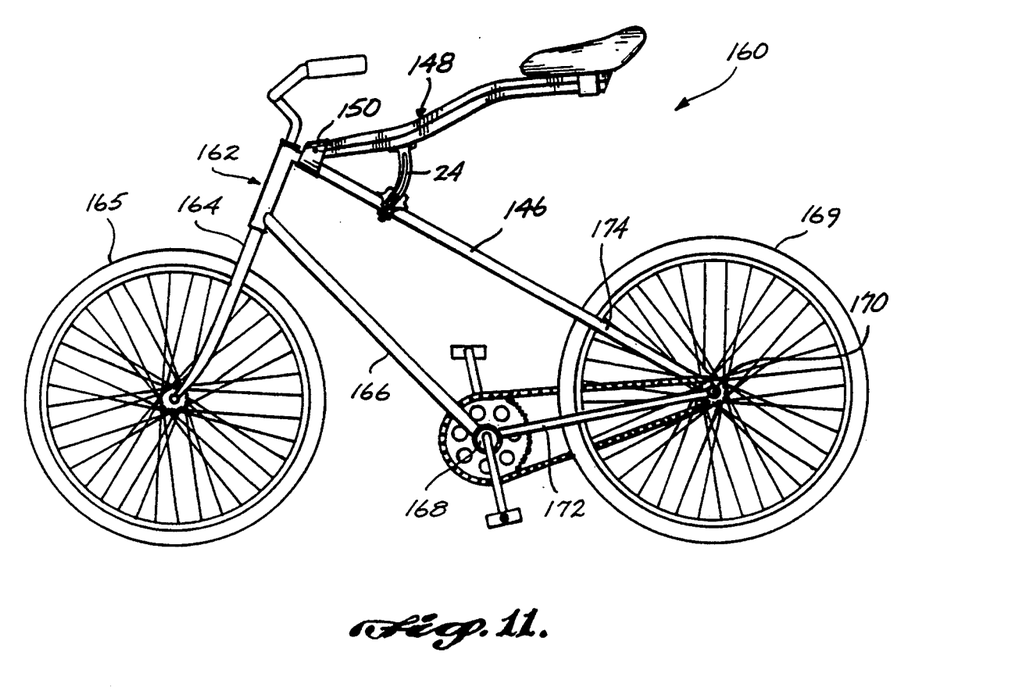
FIG. 11 is a side elevation view of one more embodiment of a bicycle including a cantilever mounted combination beam seat support made according to the present invention.

Referring now to FIG. 11, a bicycle frame 160 without a seat post to which a combination support beam 148 is mounted is illustrated. The frame 160 includes a generally vertically oriented head tube 162 to which a front fork assembly 164 is pivotally attached. A front wheel 165 is attached for rotation to the front fork assembly 164. A top tube 146 extends diagonally rearward from the head tube 162. The seat support 148 is attached to the top tube 146 by a mounting bracket 150 and a pivot control 24. A linear bottom tube 166 extends rearward from the head tube below the top tube 166. A bottom bracket assembly 168 is attached to the end of the bottom tube 166 distal from the head tube 162.

A rear wheel 169 having a rear wheel hub 170 is attached to the frame 160 by a pair of chain stays (one shown) 172 which extend from the bottom bracket assembly on both sides of the of the rear wheel 169. Frame stays 174 (one shown) extend from the end of the top tube 146 on both sides of the rear wheel 169 and are joined to the ends of the associated chain stays 172. As seen in FIG. 11, the top tube, from beyond the pivot control 24 and the frame stays 174 are substantially linearly aligned.

Still another bicycle frame 180 that can be used in combination with the combination beam support 182 is described with reference to FIG. 12. The frame 180 includes a generally vertically oriented head tube 184 to which a front fork assembly 186 is pivotally attached. A front wheel 188 is rotatably attached to the front fork assembly 186. A bottom tube 190 extends downward diagonally from the base of the head tube 184. A bottom bracket 192 (shown in phantom) is attached to the end of the bottom tube 190. A pedal-and-drive gear assembly 193 is rotatably mounted to the bottom bracket 192.

A rear wheel 194 having a rear wheel hub 196 is attached to the frame 180 by a pair of chain stays 198 (one shown) which extend rearwardly from the bottom bracket 192.

A top tube 200 extends from the head tube 184 adjacent the bottom tube to a point adjacent the rear wheel 194. Frame stays 202 (one shown) extend between the free end of the top tube 200 and the ends of the chain stays 198. The top tube 200 comprises a first section 204 which extends substantially horizontally cally from the head tube 184 and a second section 206 which extends diagonally downward from the first section to which the frame stays 202 are connected. The frame stays 202 are substantially linearly aligned with the top tube second section 206. A center tube 208 extends between the bottom bracket assembly 192 and the base of the top tube second section 206 adjacent where the frame stays 202 are attached thereto. The center tube 208 can be fastened directly to the base, or underside, of the top tube 200 because there is no need to provide the center tube with a conventional seat post.

A chain 210 extends around the assembly 193 to a multi-gear free gear 211, attached to the rear wheel hub 196. A front derailer 212 mounted to the center tube adjacent the bottom bracket 192 controls the crank assembly gear position of the chain 210. A rear derailer 214 controls the free gear position. The setting of the front and rear derailers 212 and 214 are controlled by levers 216 mounted to the bottom tube 190 and that are connected to the associated derailer 212 or 214 by cables 218 (one shown).

The combination beam support 182 is attached to the front of the top tube first section 204 adjacent the head tube 184 by a mounting bracket 220 similar to the mounting bracket described 22 with respect to FIG. 1. A pivot control means 222, similar to the pivot control means 24 described with respect to FIG. 1, also secures the combination beam support 182 to the bicycle frame 180. The pivot control means 222 is attached to the top tube 200 at the point the first and second sections 204 and 206 respectively are joined together. Both the mounting bracket 220 and the pivot control means 222 are attached to the top tube 200 by welding, threaded fasteners, or other appropriate fastening means.

The bicycle frame 180 of this invention has less bottom bracket 192 twist than conventional bicycle frames and is both smaller in size and lighter in weight than conventional reduced bottom bracket twist bicycles. Bicycle frame 180 has less twist, in part, because the center tube 208 is relatively short in comparison to the seat post tubes found in conventional adult sized bicycles, (bicycles with a tire diameter of at least 22 inches and more typically 27 inches. This is understood to mean bicycles with a wheel diameter of 22 inches or greater and, more particularly, a diameter of approximately 27 inches. Specifically, almost all center tubes 208 are between 25 and 35 cm in lensed the majority of center tubes are between 27 and 33 cm in lenght. The relatively short length of the center tube 208 minimizes its flexure so as to limit the degree the bottom bracket 192 moves out of the vertical plane with each pedal stroke.

Still another reason bicycle frame 180 has less bottom bracket twist than a conventional bicycle frame is that center tube 208 can be joined to the top tube 200 at a relatively small distance away from the rear wheel 194. This, in turn, makes it possible to shorten the length of the chain stays 198. For example, a road or racing bike having a wheel diameter of 27 inches can be constructed according to this invention with chain stays 198 having a length of approximately 39.5 cm. The relatively short length chain stays 198, like the relatively short length center tube 208, has minimal flexibility. This further limits the twist of the bottom bracket that occurs as a consequence of the cyclist's pedal stroke.

The reduced bottom bracket 192 twist of the bicycle frame 180 of this invention minimizes the amount of energy lost in each of the cyclist's leg strokes twisting the bicycle. Consequently, more energy is available for driving the chain 210 and turning the rear wheel. Moreover, the reduced bottom bracket 192 twisting diminishes the twisting to which both the chain 210 and the rear wheel derailer cable 218 are exposed. This increases the useful lifetime of both the chain 210 and the rear wheel cable 218. The reduced twisting of the chain 210 also lessens the extent the chain is rubbed against the front derailer 212. This reduces the wear on both the chain and the front derailer 212. The reduced twisting of the rear derailer cable 218 further serves to lessen the instances of the cable being twisted to the point where it causes the rear derailer 214 to inadvertently shift. This shifting can otherwise sometimes occur when intense leg strokes on the part of the cyclist causes a significant twist in the bottom bracket 192.

The bicycle frame 180 has reduced bottom bracket 192 twist, yet is constructed out of the same tubing from which a conventional bicycle is fabricated. This is unlike other reduced twist bicycle frames that are fabricated out of relatively large diameter and/or thick-walled tubing. The bicycle frame 18 of this invention is, instead, formed out of a bottom tube 190, a top tube 200 and a center tube 208 having an outside diameter of approximately 1⅛ inches and a wall thickness between 28 to 35 mils. Consequently, while the bicycle frame 180 has a reduced twist, it has a high degree of elasticity not found in other bicycle frames that offer reduced twist through increased tube diameter and size. Instead, the bottom bracket 192 still maintains a degree of elasticity, though of limited degree. This elasticity minimizes leg fatigue to which the cyclist is otherwise exposed by pedaling against a stiff, twistless bicycle frame. Moreover, this elasticity allows the leg motion of the cyclist to naturally push the bottom bracket in when on the previous half-stroke it had just been pushed "out." This can allow the cyclist to better develop a cadence that maximizes the amount of energy that is actually applied to pulling the chain 210 and turning the rear wheel 194.

Still another advantage of a bicycle provided with frame 180 is that it has reduced bottom bracket 192 twist, and is also relatively light in weight. Bicycle frame 180 is light in weight in part because, unlike other reduced twist bicycle frames, it is not formed with relatively large diameter and thick walled tubing. Still another reason why bicycle frame 180 is light in weight is that is that the center post 208 weighs significantly less than the conventional seat tube. The reduced weight of frame 180 makes a bicycle faster to ride and also minimizes the fatigue to which a rider is exposed.

Figure 12:
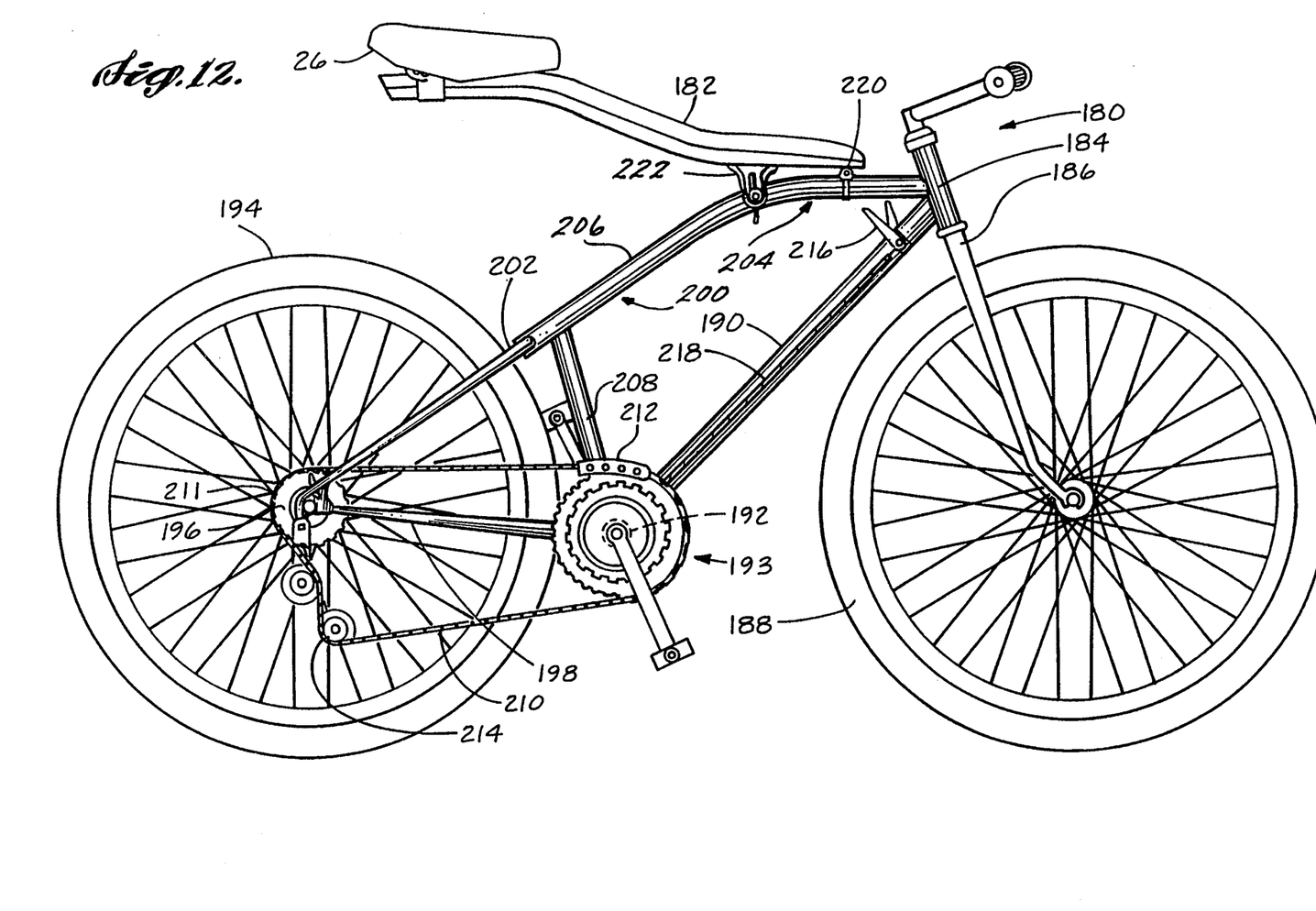
FIG. 12 is a side plan view of alternative bicycle including a cantilever mounted combination beam seat support made according to the present invention.
Figure 13:
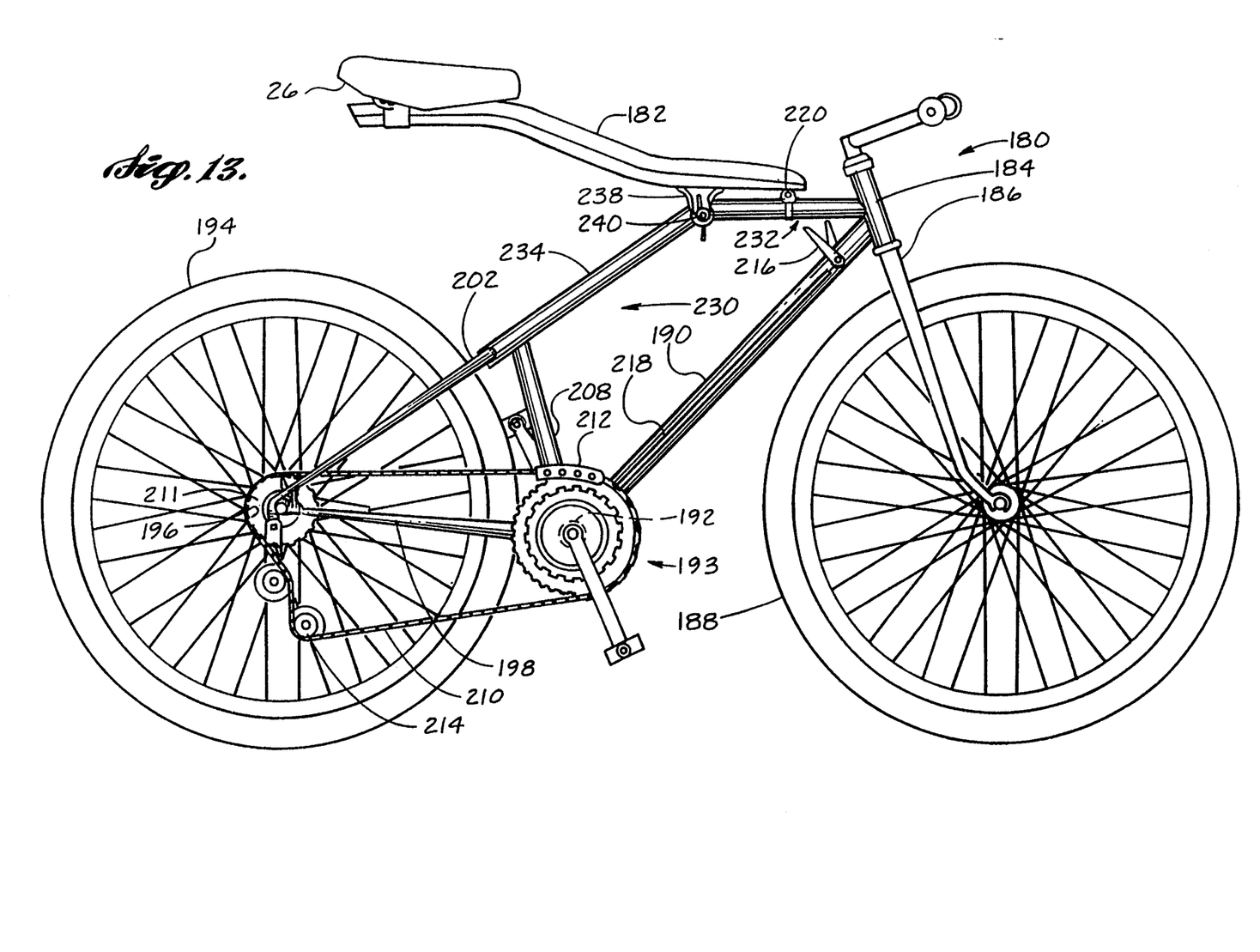
FIG. 13 is a side plan view of an alternative version of the bicycle of FIG. 12.
Figure 14:
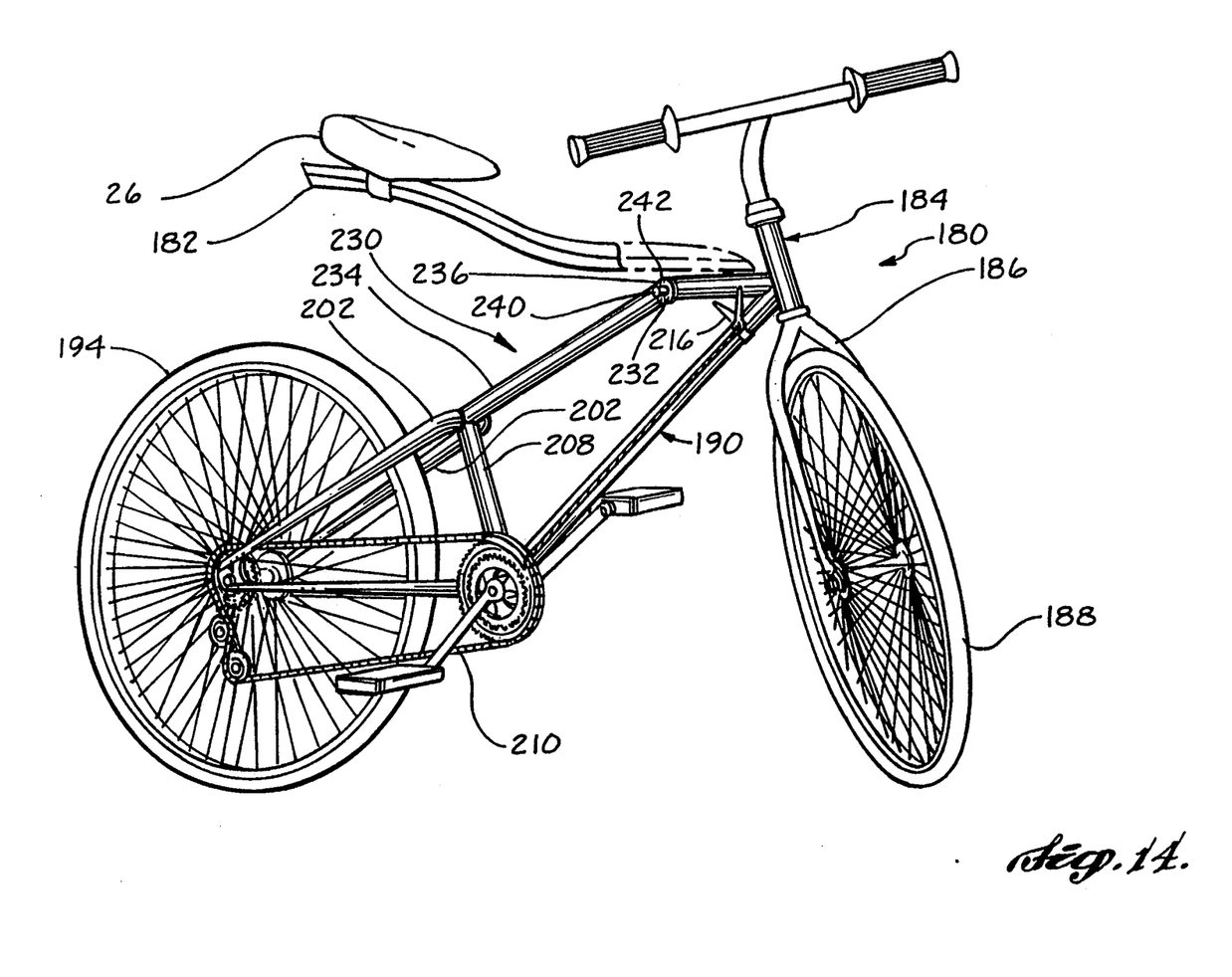
FIG. 14 is a perspective view of the bicycle of FIG. 13.

FIGS. 13 and 14 illustrate an alternative construction of a top tube 230 that can be incorporated into the bicycle frame 180 of FIG. 12. Top tube 230 is formed out of a first horizontally extending section 232 and a second diagonally extending section 234 that are separate from each other. The top tube first and second sections 232 and 234 are joined to a common transverse section 236 by welding or other appropriate means. The transverse section 236 is a cylindrical section of tubing with an axis that is perpendicular to the longitudinal axis of the bicycle.

The beam seat support 182 is attached at its front end to the top tube 230 by a mounting bracket 220. A slotted bracket 238 which is fixed to the beam support 182 a slight distance rearward of the front adjustably secures the support to the transverse section 236. The slotted bracket 238 which is similar to bracket 70 (FIG. 2), is secured to the transverse section 236 by a threaded fastener 240. The threaded fastener 240 extends through the transverse section 236 and end caps 242, that cover the axial ends of the transverse section. The height of the beam support 182 can be adjusted by setting the position of the slotted bracket 238 relative to the threaded fastener 240.

Top tube 230 has a first section 232 and a second section 234 that are formed out of separate sections of tubing. The top tube first section 232 can be formed out of a relatively thick section of tubing in order to be strong enough to support the beam support 182. The top tube second section 234 can then be formed out of a relatively narrow and/or thin-walled section of tubing so as to reduce the overall weight of the bicycle. For example, in one embodiment of the invention the first section 232 can be formed out of tubing with an outside diameter of approximately 1⅛ inches and a wall thickness of 35 mils; the second section 234 is formed out of a tube with an outside diameter of approximately one inch and a wall thickness of 24 mils.

It will be appreciated that rather than limiting the present invention to support a vehicle seat, and in particular a bicycle seat, the present invention may be employed in other situations. For instance, the present invention may be used to support the handlebars of the bicycle thereby absorbing the shock and vibration typically transmitted to the handlebars during riding. In this regard, a vibration damping layer similar to layer 36 may be incorporated into the curved portion of a typical stem used to connect the handlebars to the front fork structure. Alternatively, the vibration damping layer may be incorporated into the construction of the prongs of the front fork of the bicycle. In this contemplated application, the present invention provides essentially the same advantages for the mounting structure for the bicycle handlebars as provided for the seat of the bicycle.

Moreover, the bicycle frame may differ from what has been illustrated and described and still come within the scope of the claimed invention. For example, the top tube first sections of the bicycles of FIGS. 12-14 are shown as only extending horizontally a relatively short distance and the associate pivot control means are shown as being mounted to the top tube at the point where the top tube first and second sections meet. In alternative embodiments of the invention the top tube first section may extend horizontally a greater distance towards the rear wheel. In these embodiments of the invention the beam seat support pivot control means or other rear-located beam support mounting fixture may be simply attached to a section of the underlying top tube first section.

While the preferred embodiments of the invention have been illustrated and described, it will be understood that variations will occur to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A shock absorber for attaching a first member to abscond member, comprising:
    a first elongate beam having a front end for attachment to the second member, and a tail end distal from said front end;
    a second elongate beam located above said first elongate beam and having a front end spaced from said first beam front end so as to define a gap therebetween, and a tail end fixedly secured to said first beam tail end such that when opposed loads are imposed on said first beam front end and said second beam tail end, said beam tail ends remain fixedly secured to each other and said second beam front end shifts position longitudinally with respect to said first beam front end;
    a fastening means for securing the first member to at least one of said beam tail ends;
    an elastomeric material in said gap extending between said beam front ends, said material being deformed in response to relative movement of said beams; and
    a second member fastening means securing said first elongate beam front end and second elongate beam front end to the second member so as to prevent upward movement of said-beam front ends-and allow said second beam front end to move longitudinally.

2. The shock; absorber of claim 1, wherein said first beam and said second beam are integrally joined at said beam tail ends.

3. The shock absorber of claim 2 wherein said beams include a rigid foam core and a skin of epoxy resin bound fiberglass such that said epoxy fiberglass joins said beams together.

4. The shock absorber of claim 1, wherein said first and second elongate beams include a foam core covered by a skin of resin-bound fibers.

5. The shock absorber of claim 1, wherein each said beam includes a rigid foam core and a skin of epoxy resin bound fiberglass and wherein said elastomeric material is a polyurethane elastomer.

6. The shock absorber of claim 1 wherein said second member fastening means includes a fist clamp adapted to be secured to the second member and at least one fastener attached to said first clamp for fixedly securing said first beam front end to said clamp.

7. The shock absorber of claim 6, wherein said second member fastening means further includes a first fastener attached to said first clamp and disposed in an opening formed in said beam front ends and in said elastomeric layer for securing said second beam front end against upward movement while allowing said second beam front end to move longitudinally with respect to said first fastener.

8. The shock absorber of claim 7, wherein said first and second beams define a uniaxial opening through which said first fastener is inserted.

9. The shock absorber of claim 8 wherein said first fastener is secured to said second beam by complementary fastening elements having a selected maximum dimension and said opening defined by said second beam has a longitudinal dimension greater than said maximum dimension of said fastening elements so that at least a portion of said second beam is capable of longitudinal movement with respect to said fastener.

10. The shock absorber of claim 9 wherein each said beam is provided with a middle section located between each said beam front and tail ends, said middle section being axially offset frown said front and tail ends such that said front ends and said tail ends are axially spaced apart and approximately parallel to each other.

11. The shock absorber of claim 10 wherein said beam middle sections are spaced apart from each other such that said gap is located between said beam front ends and said beam middle sections and, said elastomeric material is located in said gap and extends between said middle sections.

12. The shock absorber of claim 11 wherein each said beam includes a middle section located between each said beam front end and a tail end, said beam middle sections being axially offset from said bean front and tail ends such that said beam front ends and said beam tail ends are axially spaced apart and are approximately parallel to each other, and said beam middle sections are spaced apart such that said gap is located between said beam middle sections and said elastomeric material is located in said gap between said middle sections.

13. The shock absorber of claim 1 wherein said beams include a foam core and a skin of resin bound fiberglass and are integrally attached by said resin bound fiberglass at said beam tail ends.

14. The shock absorber of claim 1 wherein said second member fastening means is further adapted for securing said second elongate beam against upward movement while allowing said second elongate beam, front end to move longitudinally with respect to said first beam front end.

15. The shock absorber of claim 14 wherein each said beam includes a middle section located between each said beam front end and tail end, said beam middle sections being axially offset from said beam front and tail ends such that said beam front ends and said beam tail ends are axially spaced apart and are approximately parallel to each other, and said beam middle sections are spaced apart such that said gap is located between said beam middle sections and said elastomeric material is located in said gap between said middle sections.

16. The shock absorber of claim 1, wherein:
said first and second elongate beam front ends and said elastomeric layer define a uniaxial opening, said opening in said second elongate beam having a longitudinal dimension greater than its lateral dimension; and
said fastening means includes a clamp adapted to be secured to the second member, a fastener attached to said clamp and disposed in said opening, and at least one fastening element secured to said fastener in said second elongate beam opening, said at least one fastening element having a maximum longitudinal dimension less than said selected longitudinal dimension of said second elongate beam opening so that said second beam is capable of longitudinal movement with respect to said fastener.

17. The shock absorber of claim 1, wherein adjacent sections of said first and second elongate beams are substantially parallel to each other.

18. A bicycle including:
a frame having a substantially vertically oriented head tube, bottom tube attached to said head tube and extending downward therefrom, and having a free end, a bottom bracket attached to said bottom tube free end, a pair of chain stays extending from said bottom bracket, a top tube extending from said head set having a first section extending substantially horizontally from said head set and a second section extending diagonally downward from said first section, a pair of frame stays extending diagonally downward between said top tube second section and ends of said chain stays, said frame stays being approximately linearly aligned with said top tube second section, and a center tube extending between said bottom bracket and an adjacent surface of said top tube section;
a front fork assembly pivotally attached to said head tube including a front wheel rotatably mounted thereto;
a rear wheel rotatably mounted to said frame at a location where said chain stays and said frame stays are joined;
a bicycle seat support including a first elongate beam having a front end attached to said top tube first section and a tail end distal from said front end, a second elongate beam located above said first elongate beam so as to define a gap therebetween and a tail end fixedly secured to said first beam tail end such that when opposed loads are imposed on said first beam front end and said second beam tail end, said beam tail ends remain fixedly secured to each other and said second beam front end shifts position longitudinally with respect to said first beam front end, and an elastomerie material in said gap extending between said beam front ends, said material being deformed in response to relative movement of said beams; and
a bicycle seat secured to at least one of said beam tail ends.

* * * * *

UNITED STATES PATENT AND TRADEMARK OFFICE
CERTIFICATE OF CORRECTION

PATENT NO. : 5,382,038  Page 1 of 4
DATED : January 17, 1995
INVENTOR(S) : J.D. Allsop et al.

It is certified that error appears in the above-indentified patent and that said Letters Patent is hereby corrected as shown below:

| COLUMN | LINE | |
|---|---|---|
| 1 | 10 | "Mary" should read --May-- |
| 3 | 4-5 | "elastomerie" should read --elastomeric-- |
| 6 | 5 | "vicenty" should read --vicinity-- |
| 6 | 9 | "meating 32" should read --means 32-- |
| 6 | 16 | "the the assembly." should read --the assembly-- |
| 6 | 17 | "a thin sheets" should read --thin sheets-- |
| 6 | 21 | "braiderd" should read --braided-- |
| 6 | 22 | "elastomerie" should read --elastomeric-- |
| 6 | 27 | "constructions" should read --construction-- |
| 6 | 56-57 | "is oval shapped slotted" should read --is an oval shaped, slotted-- |
| 7 | 20 | "prow 68" should read --point 68-- |
| 7 | 28 | "prow 68" should should read--point 68--. |
| 7 | 29-30 | "The beam being sealed from there" should read --The beam is sealed from point 68-- |
| 8 | 6 | "a relatively" should read --are relatively-- |

UNITED STATES PATENT AND TRADEMARK OFFICE
CERTIFICATE OF CORRECTION

PATENT NO. : 5,382,038
DATED : January 17, 1995
INVENTOR(S) : J.D. Allsop et al.

It is certified that error appears in the above-indentified patent and that said Letters Patent is hereby corrected as shown below:

| COLUMN | LINE | |
|--------|------|---|
| 8 | 7 | "perfered" should read --preferred-- |
| 8 | 10 | "illustratd" should read --illustrated-- |
| 8 | 15 | "individualy" should read --individually-- |
| 8 | 16 | "downwards" should read --downward-- |
| 8 | 46 | "interconnection point 68." should read --point 68.-- |
| 8 | 49 | "connection point 68." should read --point 68.-- |
| 9 | 36 | "is shown" should read --and is shown-- |
| 10 | 3 | "load an" should read --load, an-- |
| 10 | 51 | "of the of the" should read --of the-- |
| 11 | 10 | "horizontally cally" should read --horizontally-- |
| 11 | 35 | "bracket described 22" should read --bracket 22 described-- |
| 11 | 53 | "27 inches." should read --27 inches). |
| 11 | 57 | "lensed" should read --length and-- |
| 11 | 58 | "lenght." should read --length.-- |

UNITED STATES PATENT AND TRADEMARK OFFICE
CERTIFICATE OF CORRECTION

PATENT NO. : 5,382,038
DATED : January 17, 1995
INVENTOR(S) : J.D. Allsop et al.

It is certified that error appears in the above-indentified patent and that said Letters Patent is hereby corrected as shown below:

| COLUMN | LINE | |
|---|---|---|
| 12 | 56-57 | "anther" should read --another-- |
| 12 | 58 | "is that is that the" should read --is that the-- |
| 14 (Claim 1, | 7 line 2) | "abscond" should read --a second-- |
| 14 (Claim 1, | 30 line 25) | "said-beam" should read --said beam-- |
| 14 (Claim 1, | 30 line 25 | "ends-and" should read --ends and-- |
| 14 (Claim 2 | 33 line 1 | "shock; absorber" should read --shock absorber-- |
| 14 (Claim 2 | 33 line 2) | "integrally" should read --integrally-- |
| 14 (Claim 6 | 48 line 2) | "fist" should read --first-- |
| 15 (Claim 10, | 6 line 4 | "frown" should read --from-- |
| 15 (Claim 12, | 18 line 4 | "bean" should read --beam-- |

UNITED STATES PATENT AND TRADEMARK OFFICE
CERTIFICATE OF CORRECTION

PATENT NO. : 5,382,038
DATED : January 17, 1995
INVENTOR(S) : J.D. Allsop et al.

It is certified that error appears in the above-indentified patent and that said Letters Patent is hereby corrected as shown below:

| COLUMN | LINE | |
|---|---|---|
| 15 (Claim 14, | 6 line 4 | "beam," should read --beam-- |
| 16 (Claim 18, | 46 line 35) | "elastomerie" should read --elastomeric-- |

Signed and Sealed this

Eleventh Day of July, 1995

Attest:

BRUCE LEHMAN

Attesting Officer

Commissioner of Patents and Trademarks